R. FOGARTY.
ANTISKID DEVICE.
APPLICATION FILED MAR. 22, 1918.

1,295,472.

Patented Feb. 25, 1919.

WITNESSES

INVENTOR
R. Fogarty.
BY
ATTORNEYS

UNITED STATES PATENT OFFICE.

ROGER FOGARTY, OF NEWARK, NEW JERSEY, ASSIGNOR OF ONE-HALF TO LEWIS WALLACE, OF NEWARK, NEW JERSEY.

ANTISKID DEVICE.

1,295,472.     Specification of Letters Patent.     Patented Feb. 25, 1919.

Application filed March 22, 1918. Serial No. 223,915.

*To all whom it may concern:*

Be it known that I, ROGER FOGARTY, a citizen of the United States, and a resident of Newark, in the county of Essex and State of New Jersey, have invented a new and Improved Antiskid Device, of which the following is a full, clear, and exact description.

This invention relates to an anti-skidding device of that type embodying chains which extend transversely across the tread of the tire.

The invention has for its general objects to provide a simple, novel and effective means for attaching chains or equivalent elements to a wheel so as to prevent skidding, the attaching means being in the form of an open spring ring that lies concentrically to and inwardly from the felly, and which has overlapping ends with nuts or equivalent removable devices on the ends so as to prevent the ring from becoming automatically detached from the anti-skid chains. This construction is advantageous, as it can be easily and quickly applied, the chains can be adjusted to any position, the resiliency of the retaining ring permits the chains to yield under sudden shocks so that breakage is prevented, the chains are held firmly but movably against the tire by the resiliency of the retaining ring, the parting or breakage of any chain will not interfere with the use of the remaining chains, and the ring by being arranged on the outside of the wheel prevents any broken or parted chain from becoming entangled with the band brake or other part of the vehicle.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a side view of a wheel with an anti-skidding device applied thereto;

Figure 1:
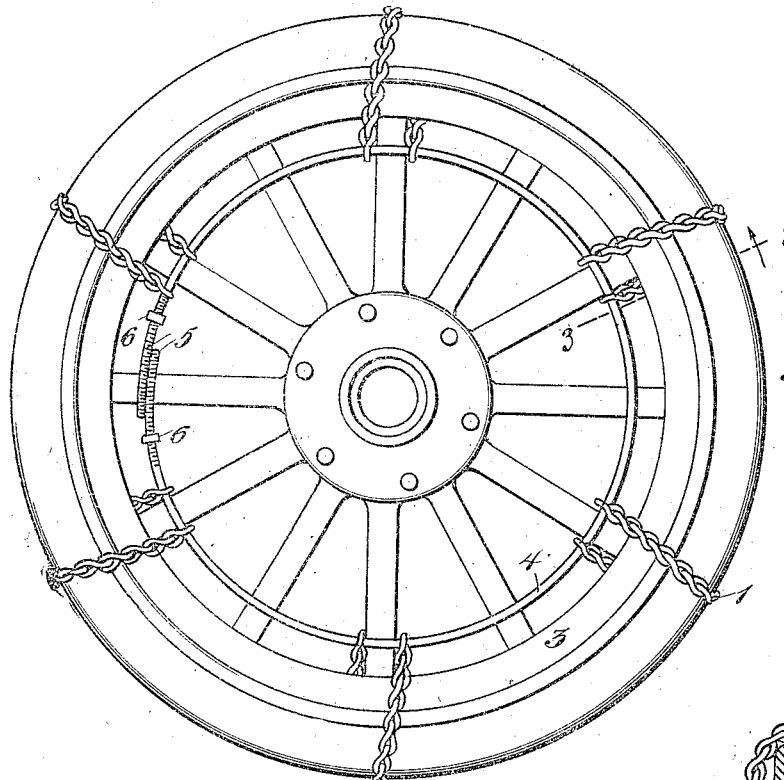

Referring to the drawing, A designates a vehicle wheel with the anti-skid device applied thereto, said device comprising a plurality of chains 1 which extend transversely around the tire 2 and felly 3. The chains are held in place by a retaining ring 4 which is made from a steel rod of round, or other cross-section and bent into annular form of such diameter as to lie concentrically with and inwardly from the felly of the wheel, the ends 5 of the ring being free from each other and in overlapping relation, so that the ring can be opened for threading on the anti-skid chains 1. On the ends of the ring are nuts or other stops 6 to prevent the ring from working loose from the chains.

Figure 2:
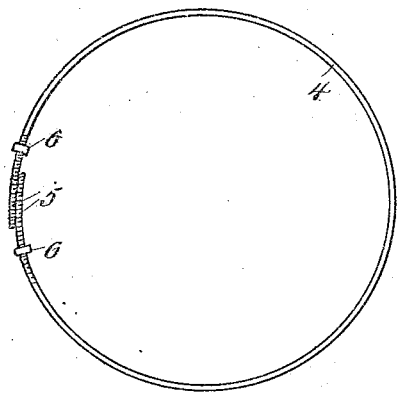
Fig. 2 is a view of the chain retaining ring.
Figure 3:
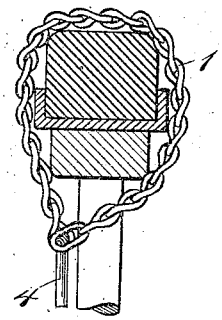
Fig. 3 is a transverse section on the line 3—3, Fig. 1.
Figure 4:
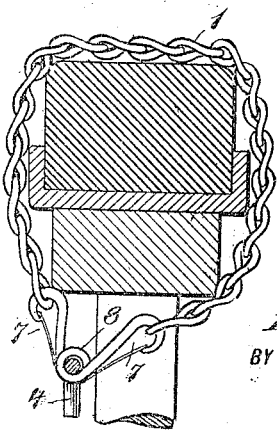
Fig. 4 is a transverse section showing a modified form of the invention.

In Figs. 1 to 3 inclusive the ends of each chain are brought into alinement so that the retaining ring can be threaded through the end links of the chain, but according to the modification shown in Fig. 4, the ends of the chain are hooked into clips 7 on a special form of attaching member which has an eye 8 through which the retaining ring passes. In both arrangements the chains are held firmly but movably on the tire by reason of the retaining ring being normally under a tension. Any chain is free to yield when it encounters an obstruction or is subjected to shock, because of the resiliency of the retaining ring, and consequently the chains do not break, except when worn away. The device is of extremely simple construction, of durable and substantial design and can be easily and quickly applied to or removed from a wheel.

From the foregoing description taken in connection with the accompanying drawings, the advantages of the construction and method of operation will be readily understood by those skilled in the art to which the invention appertains, and while I have described the principle of operation, together with the device which I now consider to be, the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a wheel with an anti-skid device thereon comprising a resilient open ring having overlapping ends, flexible members extending across the tire of the wheel and connected with the ring, and removable stops on the ends of the ring.

2. The combination of a vehicle wheel, chains extending across the tire of the wheel, a resilient ring arranged concentrically to and inwardly from the tire, said ring being open and having overlapping ends, and stop devices on the ends of the ring, said chains being connected with the ring at spaced points.

ROGER FOGARTY.